United States Patent [19]

Sandqvist

[11] 4,074,501
[45] Feb. 21, 1978

[54] METHOD OF SECURING A SEALING LAYER TO A SUPPORT

[76] Inventor: Sune Allan Sandqvist, Skalldalsvagen 34, S-430 80 Goteborg, Sweden

[21] Appl. No.: 678,665

[22] Filed: Apr. 20, 1976

[30] Foreign Application Priority Data

Apr. 24, 1975  Sweden .............................. 75047423

[51] Int. Cl.² .............................................. E04B 7/00
[52] U.S. Cl. ........................................ 52/741; 52/410; 85/28; 156/71; 156/92
[58] Field of Search ................................ 85/28, 53, 54; 151/41.7; 156/71, 92, 91; 52/741, 746, 747, 748, 63, 408, 410

[56] References Cited

U.S. PATENT DOCUMENTS

| 294,579 | 4/1884 | Childs | 52/553 |
|---|---|---|---|
| 742,589 | 10/1903 | Casler | 52/549 |
| 2,420,421 | 5/1947 | Eason | 156/71 |
| 2,724,303 | 11/1955 | Holcomb | 52/553 |
| 3,396,434 | 8/1968 | Overhoff | 85/54 |
| 3,469,490 | 9/1969 | Pearce | 151/41.7 |
| 3,483,664 | 12/1969 | Funk | 156/71 |
| 3,632,465 | 3/1969 | Hardingham | 52/249 |
| 3,671,371 | 6/1972 | Wolf | 156/71 |
| 3,750,523 | 8/1973 | Fujita | 85/28 |
| 3,933,546 | 1/1976 | Gohda | 156/71 |

FOREIGN PATENT DOCUMENTS

| 6,606,321 | 11/1967 | Netherlands | 85/28 |
|---|---|---|---|
| 1,245,333 | 9/1971 | United Kingdom | 156/91 |
| 419,959 | 11/1934 | United Kingdom | 85/28 |

Primary Examiner—Price C. Faw, Jr.
Assistant Examiner—Henry Raduazo
Attorney, Agent, or Firm—Robert E. Burns; Emmanuel J. Lobato; Bruce L. Adams

[57] ABSTRACT

A method of making a flat, or nearly flat roof watertight by covering the roof with a sealing layer, particularly a polyvinyl chloride sheet, and securing the sheet to the underlying structure by a number of plates and screws or nails passing through the plates. To provide a watertight and durable joint between the polyvinyl sheet and the plate, a bonding agent is applied on the sheet on the intended points of securement of the plates, and a seal is provided between the screw or nail head and the plate.

11 Claims, 6 Drawing Figures

METHOD OF SECURING A SEALING LAYER TO A SUPPORT

BACKGROUND OF THE INVENTION

The present invention concerns a method of securing a sealing layer to a support, particularly a sheet of synthetic resin to the outer surface of a roof.

To cover roofs that extend horizontally or at a comparatively small angle of inclination it is nowadays common practice to use a sealing layer consisting of a sheet of polyvinyl chloride. A sheet of this kind is in itself a good protection against penetration of water into the framework of the roof. The sealing layer, which usually is laid on top of a heat-insulating layer, naturally must be anchored so as not to be blown off or slide away from the roof. For this purpose, the sealing layer is secured with the aid of plates or mouldings of sheet metal or plastics through which are passed fastening means, such as screws or nails which are screwed (nailed) to the support.

The sealing layer may in principle be secured to the support in two different ways. Either each plate is initially secured to the support by means of a screw or nail, whereafter the sealing layer is arranged on top of the plates and secured thereto by an adhesive. Alternatively, the sealing layer may first be deposited on top of the roof, whereafter the plates are placed on top of the sealing layer, and a screw or nail is then passed through each plate, the sealing layer, and any other roof-covering layers, and fastened to the support.

The first-mentioned method, i.e. positioning of the sealing layer on top of the plates, offers the advantage of providing a roof that with considerable certainty is completely watertight. However, it is a complicated task to secure the sealing layer of the plates as their exact locations underneath the synthetic resin film are difficult to keep account of. Furthermore, the sucking force generated by the wind and to which the external face of the sealing layer is exposed may gradually cause ripping off of the sealing layer from the plates as a result of the so called peeling effect.

To guarantee that the sealing layer is secured to the underlying layers, the second one of the above-mentioned methods has often been chosen, i.e. positioning of the plates on top of the sealing layer. However, another problem arises in this case, as it becomes difficult to obtain a completely watertight joint in the area around each plate and its associated screw or nail. In order to make the joint tight, one has therefore been forced to place on top of each plate a piece of a synthetic resin film or a strip on top of a row of plates and secure the film by an adhesive to the sealing layer. However, it means a considerable complication to have to produce such film pieces and also more equipment and material must be brought onto the roof. Also, the inherent springiness of a roof of the kind described causes it to bend when walked on, and as a consequence thereof, the plates may be depressed to such a degree that the screws or nails passing through the plates will be displaced upwards, somewhat above the plates and possibly also penetrate through the synthetic resin pieces covering the plates. If this happens, water may easily seep in through the openings thus formed and trickle along the screws or nails into the substructure and cause considerable damage thereto.

SUMMARY OF THE INVENTION

The purpose of the invention is to provide by much simplified means, a mechanically durable as well as watertight joint in a sealing layer intended to be secured to a roof. More precisely, the invention concerns a method of securing a sealing layer to a support, particularly a sheet of synthetic resin to the external face of a roof, with the aid of plates, made of plastics or plastics-coated sheet metal, and fastening means, such as screws or nails which are screwed (nailed) through apertures formed in the plates and anchored to the support. The method of the invention is characterised by the following steps:

depositing the sealing layer,
applying a bonding agent on top of the sealing layer at the intended points of securement of the plates,
applying a fastening means through each plate and pressing the plate against the sealing layer to which layer the plate is securely joined by the bonding agent and
sealing the screw or nail head relative to the plate.

As an additional guarantee against water seepage between the plates and the sealing layer a hardenable sealing compound is preferably applied about the marginal portions of the plates as well as over the head of the screw or nail.

The joint between the sealing layer and the plates becomes extremely durable as the joint will not be exposed to tensile forces.

A particularly strong joint is obtained if the sealing layer is made from a sheet of softened polyvinyl chloride, the plates are made from e.g. a semi-rigid polyvinyl chloride, and as the bonding agent is used a solvent of a kind which joins the materials to one another as a result of the so-called expansion welding effect.

BRIEF DESCRIPTION OF THE DRAWINGS

Further advantages offered by the invention will become apparent from the following detailed description with reference to the accompanying drawings, wherein.

DETAILED DESCRIPTION OF PREFERRED EMBODIMENTS

Figure 1:
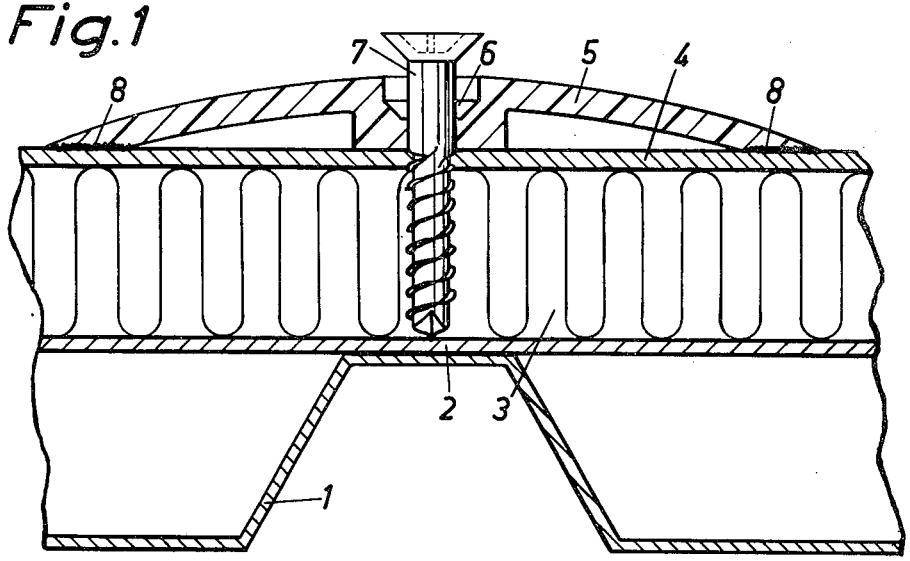
FIG. 1 is a vertical section through a plate according to the invention disposed on top of a sealing layer and in position for securement by means of a screw.

The method in accordance with the invention is intended to be used in roof structures of a kind known per se. On a load-bearing support 1, in the drawing in the form of profiled or channeled sheet-metal sections, it positioned a sheet 2 of synthetic resin serving as a diffusion barrier, and on top thereof a heat-insulating layer 3. On the latter layer 3 is in turn arranged a sealing layer 4 which consists of a water-impermeable sheet of softened polyvinyl chloride. The sealing layer 4 is secured to the layer underneath by means of plates 5 of a semi-rigid polyvinyl chloride, and in each of which is formed a centrally located aperture 6. Through the aperture is inserted a self-drilling or self-tapping screw 7 which is screwed through layers 4, 3, and 2, so as to be anchored to the support 1.

Figure 2:
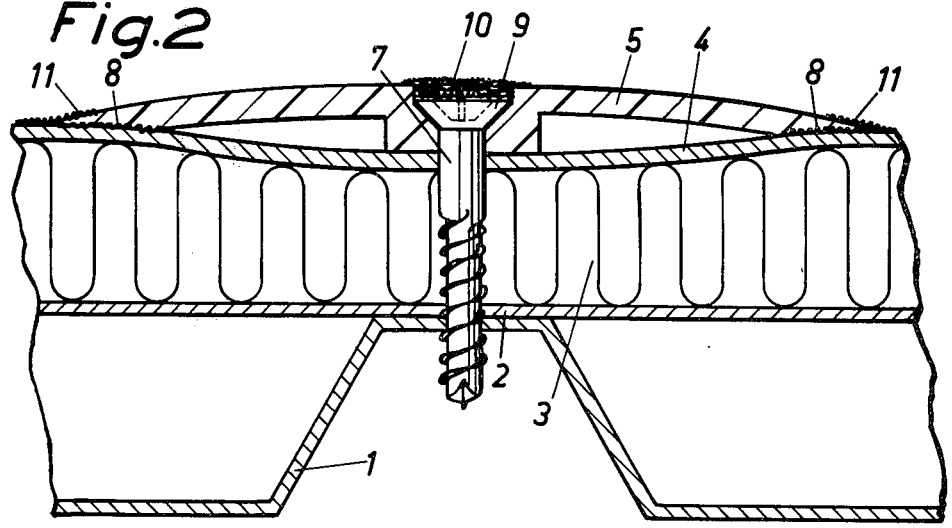
FIG. 2 shows the plate in its completely mounted condition.

The method in accordance with the invention is effected in the following manner. A bonding agent 8 which preferably should be a swelling welding agent is applied on top of the deposited sealing layer 4 in the intended areas of application of the plates 5. A screw 7 is thereafter passed through each plate 5 and, as mentioned earlier, is screwed into the support 1. Within short, after a few minutes only, the bonding agent 8 will have formed a completely tight cold welding joint or swelling welding joint between the sealing layer 4 and the plate 5. After tightening of the screw 7, the aperture 6 above the screw head 9 is filled with a bonding agent (liquid plastics). In this case, this agent consists of a sealing compound 10 which hardens so as to form a sealing plug above the screw head 9 (see FIG. 2). As a double guarantee against penetration of water between the sealing layer 4 and the plate 5 the same type of sealing compound may then be applied in the form of a strand or bead 11 along the peripheral edge of the plate 5.

Figure 3:
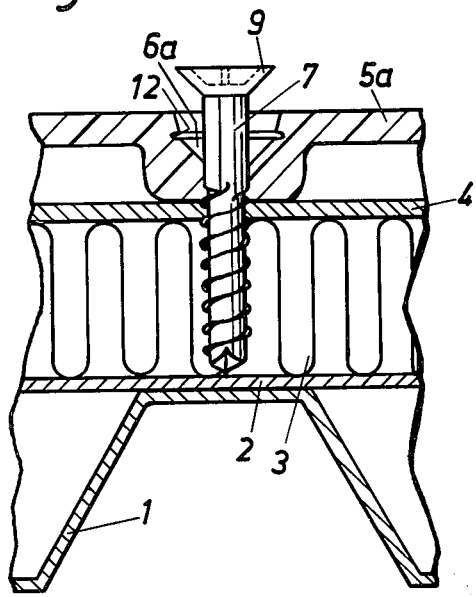
FIGS. 3 and 4 are vertical sectional views through the centre portion of a plate in accordance with a second embodiment.
Figure 4:
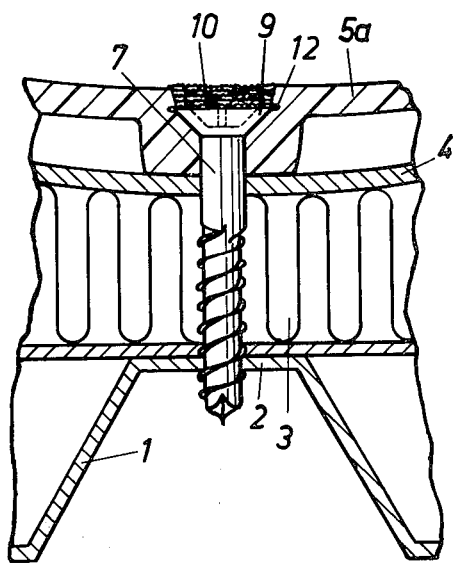

Naturally, it is very important not only to take care that the seal above the screw head 9 is efficient from the start, but also to ensure that the plug thus formed is retained in its sealing position, when the plate is exposed to stress. As mentioned above, problems have been encountered when using the attachment method according to which the plate 5 is positioned on top of the sealing layer 4 in that the screw 7, upon depression of the plate, tends to be displaced upwards somewhat and in doing so, it punctures the polyvinyl chloride sheet above the plate, thus making penetration of water through the sealing layer possible. As appears from FIGS. 3 and 4, this risk may be eliminated by providing the aperture 6a in the plate 5a with a recess defined by annular step 12 which fits the screw head 9, whereafter the screw 7 is driven inwards to such an extent that the marginal edges of the screw head 9 will enter into this recess. The force tending to bring about relative displacement between the screw 7 and the plate 5a when the latter is loaded, will then be transferred from the screw head directly to the plate, thus preventing any substantial load on the bonding agent plug 10 above the screw head and consequently eliminating the risk of the plug separating from the plate.

Figure 5:
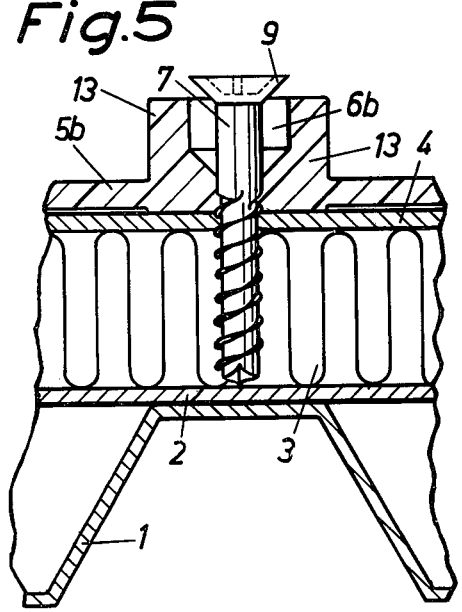
FIGS. 5 and 6 are similar views, illustrating a third embodiment of the invention.
Figure 6:
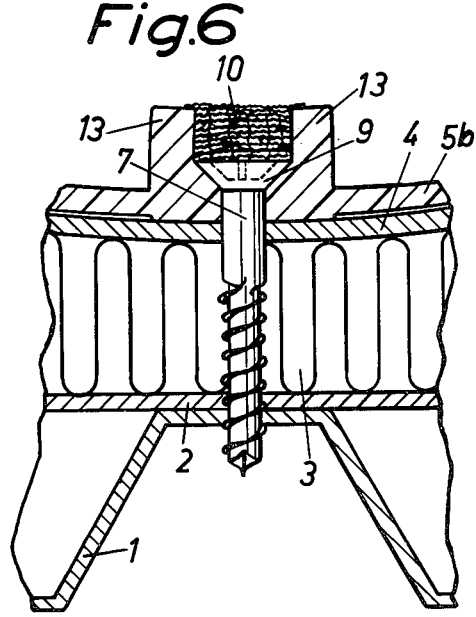

Such guaranteed adherence may also be achieved by providing flanges 13 around the centre aperture 6b of the plate 5b, as illustrated in FIGS. 5 and 6. If, in addition thereto, a screw 7 used has a head diameter which somewhat exceeds the diameter of the aperture 6b, the flanges 13 will resiliently bend slightly outwards when the screw is pulled downwards. As soon as the screw head 9 is screwed home to the bottom inside the aperture 6b, the flanges 13 will spring back, while forming a seal around the head. When the screw 7 is tightened further, the flanges 13 will converge somewhat towards the middle of the plate 5b, thus additionally preventing the screw head 9 from pushing upwards inside the aperture 6b when the plate 5b is loaded.

The invention is not limited to the method described but many modifications and variations are possible within the scope of the appended claims.

What I claim is:

1. An improved method of securing a sheet-like sealing layer to a springy underlying support, using elastic plates each having an aperture therethrough and elongate fastening means having a head and dimensioned to pass through a plate aperture up to the head and penetrate into said support for fastening the plate thereto, comprising:
    (a) disposing said sealing layer on said support;
    (b) applying a bonding agent on top of said sealing layer on the intended areas of securement of said plates;
    (c) inserting ones of said fastening means through respective ones of said plates and pressing said plates against said sealing layer at the areas at which the bonding agent was applied for compressing the springy underlying support beneath said plates and securing said plates to the springy underlying support with said fastening means, and for securely joining said plates to said sealing layer by means of said bonding agent; and
    (d) bonding the heads of said fastening means to said plates for preventing relative movement between said plates and said heads of said fastening means.

2. An improved method as claimed in claim 1, wherein said plates are made from plastics-coated sheet metal.

3. An improved method as claimed in claim 1, further comprising applying a hardenable sealing compound along the peripheral edges of said plates at said sheet-like sealing layer for effecting a weather-proof seal therebetween.

4. An improved method as claimed in claim 1, wherein bonding the heads of said fastening means comprises applying a hardenable sealing compound on top of the heads of said fastening means and on said plates immediately adjacent the respective heads of said fastening means to form a hardened seal thereat.

5. An improved method as claimed in claim 1, comprising using a sheet of polyvinyl chloride as said sealing layer, a semi-rigid polyvinyl chloride as the material of said plates, and using a liquid polyvinyl chloride as said bonding agent.

6. An improved method as claimed in claim 1, wherein the aperture formed in each of said plates for passage therethrough of said fastening means includes a recess for receiving said head of said fastening means, and wherein said fastening means is driven suffiently far into said support that the peripheral edges of said head of said fastening means are received within said recess.

7. An improved method as claimed in claim 1, wherein said plates include flanges extending about each plate aperture, said flanges dimensioned to form a seal about said head of said fastening means while converging towards the center of said plate when said fastening means are completely driven into said support.

8. An improved method as claimed in claim 7, comprising using a fastening means having a head diameter which somewhat exceeds the diameter of said aperture formed in said plate.

9. A method of securing a sheet-like cover to a surface of a springy support, comprising:
    (a) spreading out the sheet-like cover on the surface of the springy support so that the support surface is underlying a bottom of the sheet-like cover;
    (b) applying a bonding agent between the top of the sheet-like cover and a bottom surface of a plate-like member with the plate-like member lying on top of the sheet-like cover, wherein the plate-like member has an aperture therethrough with an enlarged recess portion at a top surface of the plate-like member;

(c) compressing said springy support beneath the plate-like member;

(d) securing the plate-like member to the support while the support is compressed with a fastener of the type having a narrow elongated body portion and an enlarged head portion by inserting the fastener body portion through the plate-like member aperture and into the support to a sufficiency depth so that the fastener head portion bears against the recess bottom and is completely received therein; and (e) bonding the fastener head portion in the recess with a hardenable sealing compound to form a hardened plug within the recess which is effective to prevent relative movement between the fastener head portion and the plate-like member upon flexure of said springy support.

10. A method according to claim 9, wherein said recess includes an inner annular stepped portion for engaging the head portion of the fastener when the fastener head portion is at the bottom of the recess whereby upward movement of the fastener relative to the plate-like member is prevented by the annular stepped portion.

11. A method according to claim 11, wherein the plate-like member includes an annular resilient flange defining therein the recess for receiving the fastener head portion, and wherein a diameter of the recess defined by the flange is slightly less than a diameter of the fastener head portion so that insertion of the fastener head portion into the recess is effective to flex the flange which thereby engages the fastener head portion to prevent relative displacement between the plate-like member and the fastener head portion.

* * * * *